(12) United States Patent
Benjamin et al.

(10) Patent No.: US 9,008,825 B2
(45) Date of Patent: Apr. 14, 2015

(54) CONTAINER UNLOADING SYSTEM WITH AUTO-UNLOAD CAPABILITY

(71) Applicant: Honda Logistics North America, Inc., East Liberty, OH (US)

(72) Inventors: Eric Gregg Benjamin, Carmel, IN (US); Masahiko Minamikawa, Columbus, IN (US)

(73) Assignee: Honda Logistics North America, Inc., East Liberty, OH (US)

( * ) Notice: Subject to any disclaimer, the term of this patent is extended or adjusted under 35 U.S.C. 154(b) by 268 days.

(21) Appl. No.: 13/854,743

(22) Filed: Apr. 1, 2013

(65) Prior Publication Data
US 2014/0297023 A1    Oct. 2, 2014

(51) Int. Cl.
*G06F 7/00*      (2006.01)
*B65G 47/04*    (2006.01)

(52) U.S. Cl.
CPC ..................................... *B65G 47/04* (2013.01)

(58) Field of Classification Search
None
See application file for complete search history.

(56) References Cited

U.S. PATENT DOCUMENTS

| | | | |
|---|---|---|---|
| 3,559,822 A | 2/1971 | Lichtenford et al. | |
| 3,833,140 A | 9/1974 | Young et al. | |
| 4,392,771 A | 7/1983 | Smalley | |
| 4,459,076 A | 7/1984 | Pettersson | |
| 4,543,031 A | 9/1985 | Luebrecht et al. | |
| 4,553,893 A | 11/1985 | Kaschner et al. | |
| 4,682,927 A | 7/1987 | Southworth et al. | |
| 4,690,609 A | 9/1987 | Brown | |
| 4,940,000 A | 7/1990 | Horvath et al. | |
| 5,899,659 A * | 5/1999 | Beilsmith | 414/796.2 |
| 6,216,844 B1 | 4/2001 | Simonis | |
| 6,379,104 B1 * | 4/2002 | Domino et al. | 414/662 |
| 6,481,558 B1 | 11/2002 | Bonora et al. | |
| 6,758,111 B2 | 7/2004 | Buonauro | |
| 7,410,340 B2 | 8/2008 | Bonora et al. | |
| 2002/0127089 A1 | 9/2002 | Stone et al. | |
| 2006/0280580 A1 | 12/2006 | Lutz | |
| 2007/0193855 A1 | 8/2007 | Couture, Jr. et al. | |

* cited by examiner

*Primary Examiner* — Yolanda Cumbess
(74) *Attorney, Agent, or Firm* — Standley Law Group LLP

(57) ABSTRACT

A container unloading system that is adapted to automatically unload containers from carts while the containers and carts reside in an unloading station. The containers may be off-loaded onto a conveyor. The system includes a frame that is movable along the path of ingress/egress of the carts, and a vertically and horizontally movable lifting device that is supported on the frame and adapted to engage and lift the containers. A number of sensors may be present to gather information about the carts and/or containers and to send corresponding signals to a controller that is programmed to automatically operate the system.

18 Claims, 9 Drawing Sheets

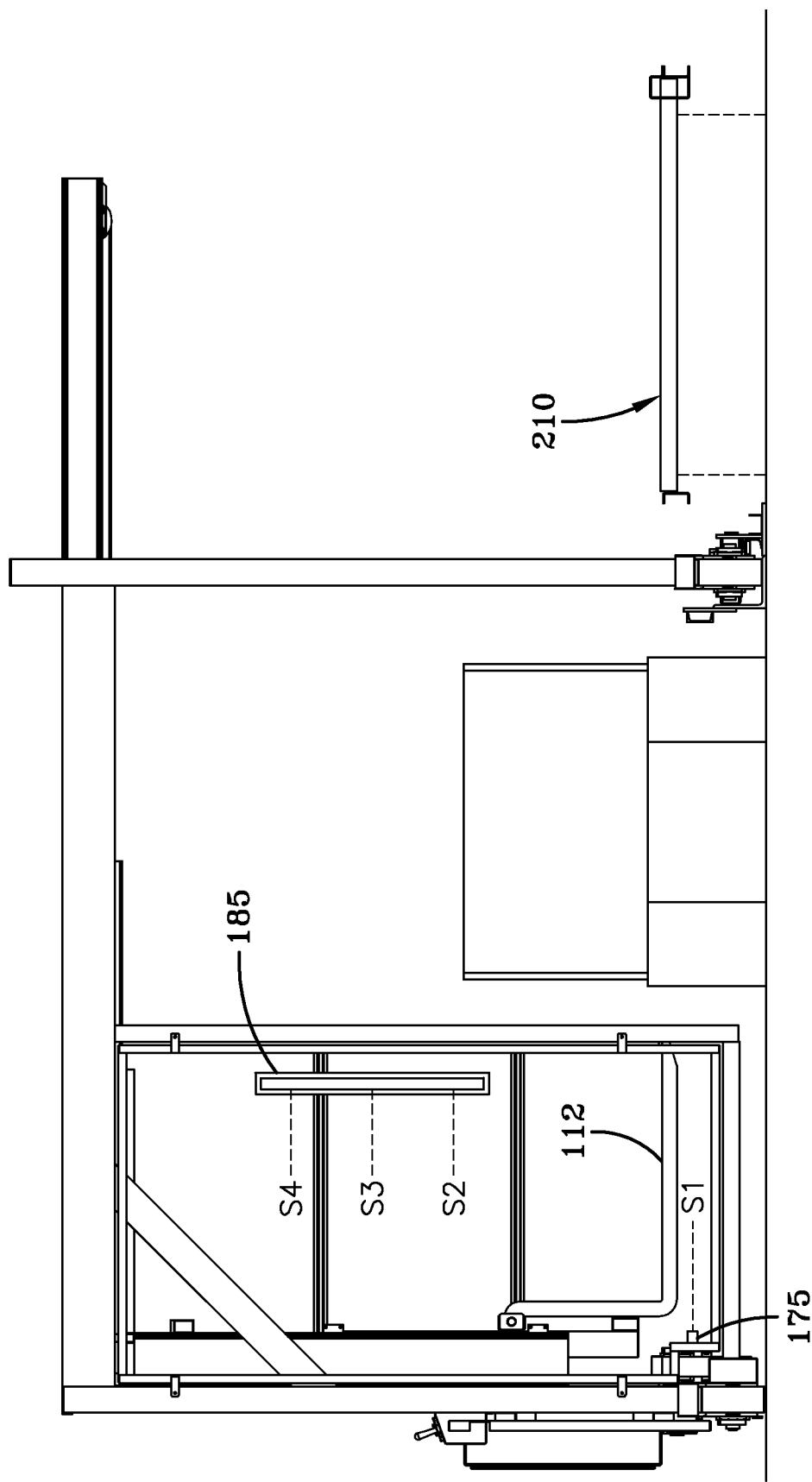

CONTAINER UNLOADING SYSTEM WITH AUTO-UNLOAD CAPABILITY

TECHNICAL FIELD

Exemplary embodiments of the invention are directed to a system for unloading, possibly automatically, containers or similar objects onto a conveyor or similar apparatus.

BACKGROUND

In large facilities such as assembly plants or the like, the efficient movement of materials, parts, subassemblies, etc., from one location to another may be extremely important task to the overall function of the facility. For example, an unintended assembly plant assembly line stoppage generally results in significant lost revenue. Consequently, each station on an assembly line must be fed with an adequate supply of materials to keep the line moving without unintended stoppages.

Complicating matters, however, is the fact that today's streamlined production and workflow models do not allow for large volume inventory (e.g., parts) storage, so assembly line stations, etc., typically operate with a minimum of stored materials at any given time. One such method of note is 'Right Parts in the Right Place at the Right Time' (RPT) manufacturing. When practicing this type of distribution method, parts must move quickly from the supplier's factory to the final assembly line with little time and space wasted in between. It can thus be understood that in a large assembly plant that produces a high volume of outgoing products, moving thousands of parts to hundreds of different workstations can be a daunting task.

In order to meet low inventory production requirements, facilities often employ systems that are able to load and unload different types and sizes of containers from and onto a guided rail or roller system that functions to move the containers around the facility. In many factories, for example, containers of parts, fasteners, etc., may be transported throughout the factory by various tugger, tram or train systems that haul multiple cars/carts loaded with various containers. Typically, such distribution systems will try to minimize the amount of action required by human operators/workers, such as by employing lift-assist devices that allow works to lift and move heavy objects.

More advanced loading and unloading devices and systems have also been developed, such as those disclosed in U.S. application Ser. No. 12/240,889 filed on Sep. 29, 2008. These devices and systems allow a worker to quickly and easily load and unload a variety of different containers moved by a transportation system, such as containers located on one or a train of cars pulled by a tugger, automated guided vehicle (AGV), tram, etc.

While devices and systems like those described above have helped to streamline the process of moving materials about a facility, there is still room for improvement. For example, there remains a need for unloading devices and systems that can unload containers with less operator involvement—such as containers that have been transported to an unloading location by an automated transport system or some other means. Embodiments of the invention are directed to devices and systems that can perform such an unload function substantially or fully automatically.

SUMMARY

Exemplary embodiments of the invention are directed to container unloading systems that, at least in certain variations, operate in an automated or semi-automated manner. Such a system generally includes a frame that is located near a container unloading area (station) and is movable laterally along the path of container ingress/egress. A drive mechanism is provided to produce lateral movement of the frame. A container unloading mechanism in the form of a driven fork arm is supported on the frame. The fork arm is adapted for powered movement in both a vertical direction and also in a direction transverse to the path of container ingress/egress. The system may be controlled by an operator or may operate in an automated or semi-automated manner.

Various control mechanisms may be provided for operator use in certain embodiments. Alternatively, or in conjunction therewith, various sensors and other devices may be provided and placed in communication with a controller so as to permit a system to perform an automatic unloading function. For example, a bar code scanner may be provided to read container bar codes, reflection or similar sensors may be provided to detect the fork arm compartments by which the containers are lifted and/or to trigger the scanner or detect container height, and a photo eye or other suitable sensor may be provided to detect containers located on an associated conveyor system. As a result, when a container, or more likely a train of containers, is brought to the unloading station by means of a tugger, AGV, tram, etc., the unloading system may automatically detect and proceed to automatically unload the containers.

BRIEF DESCRIPTION OF THE DRAWINGS

In addition to the features mentioned above, other aspects of the present invention will be readily apparent from the following descriptions of the drawings and exemplary embodiments, wherein like numerals across the several views refer to identical or equivalent features, and wherein:

FIG. 9 is a simplified schematic elevation view of a portion of the container unloading system of FIG. 1.

DETAILED DESCRIPTION OF EXEMPLARY EMBODIMENTS

Figure 1:
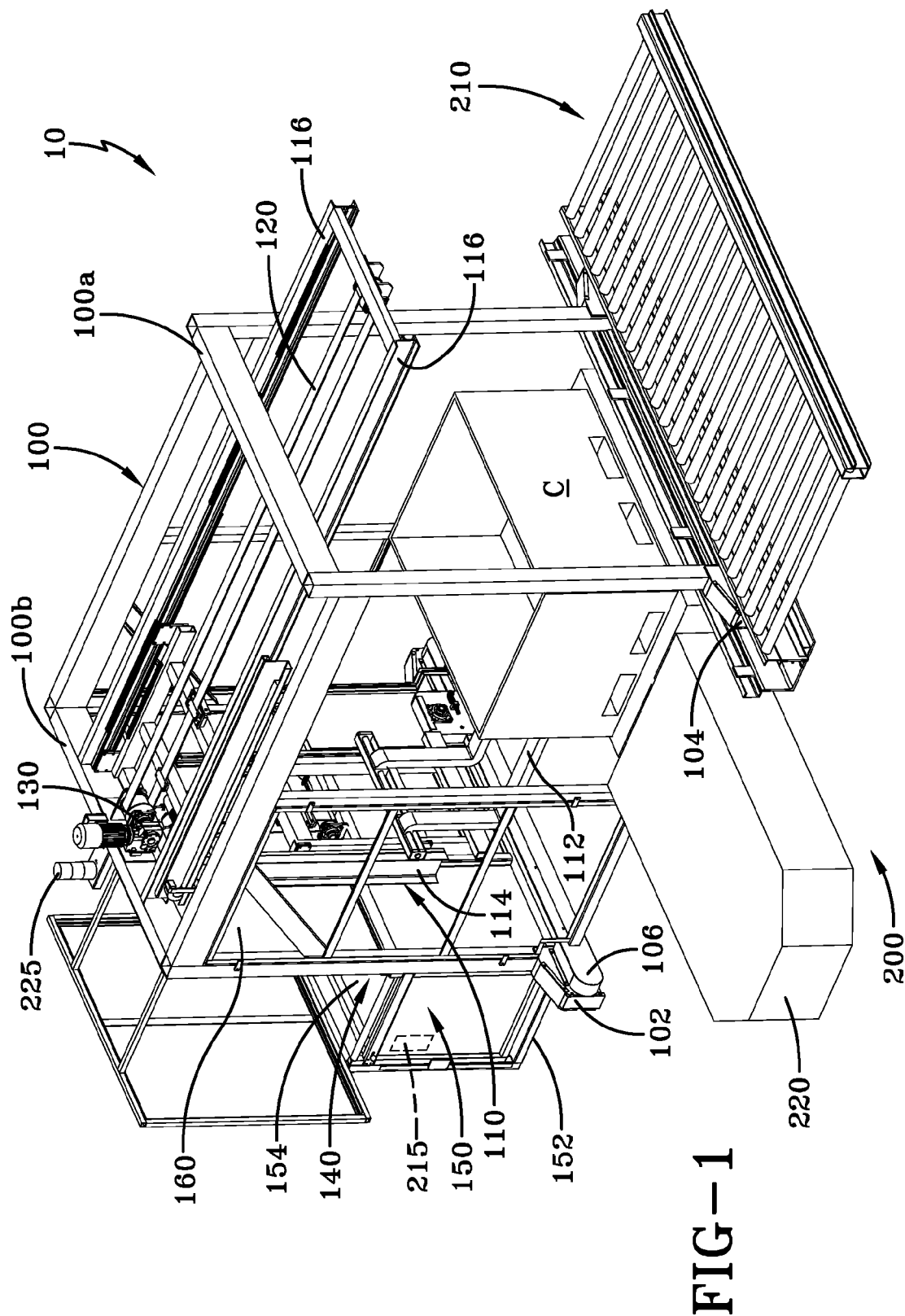
FIG. 1 is a perspective view illustrating one exemplary embodiment of a container unloading system of the invention, with a fork arm portion of the system in a retracted position.
Figure 2:
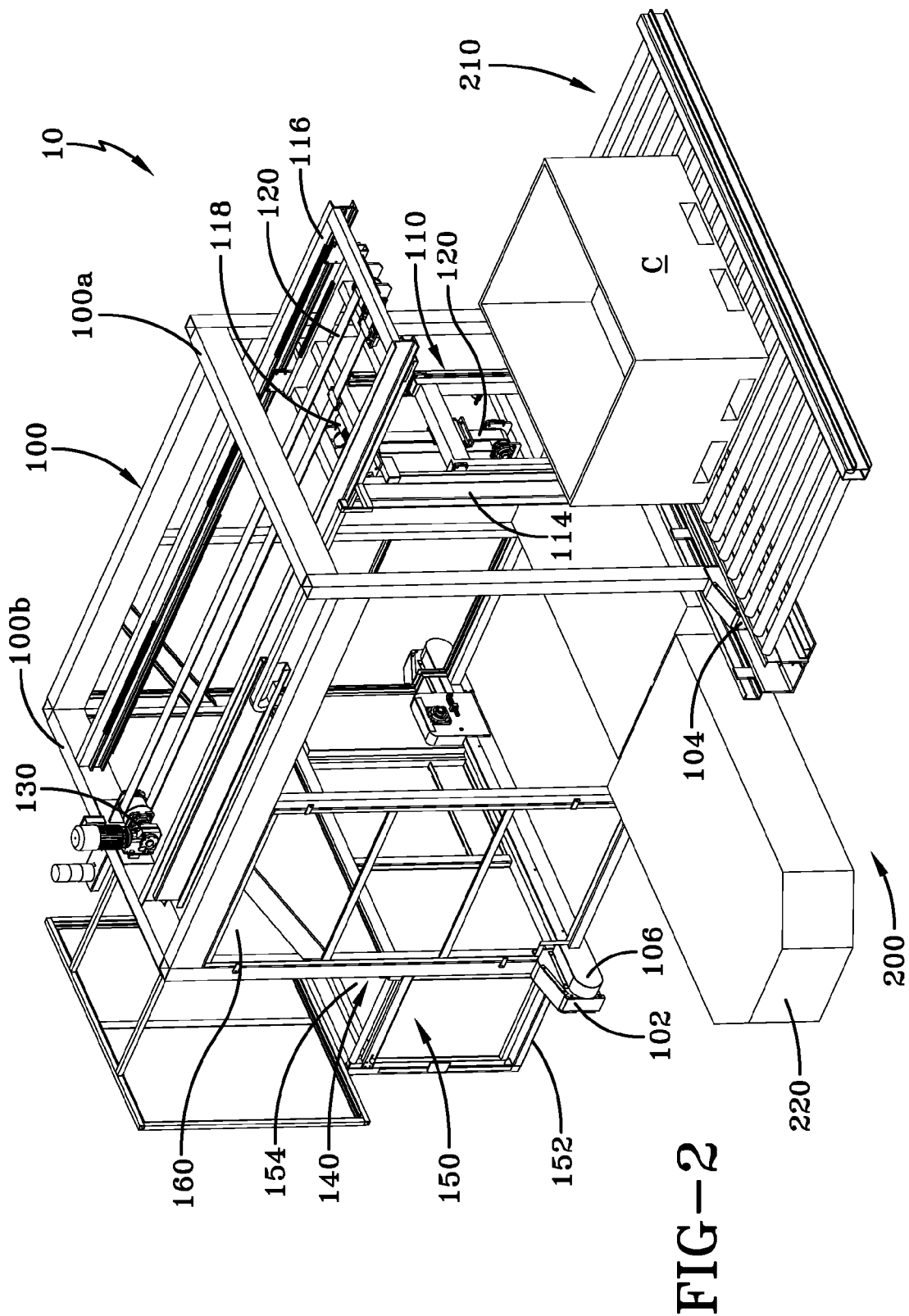
FIG. 2 shows the container unloading system of FIG. 1 with the fork arm engaged with and placing a container onto a conveyor system.
Figure 3:
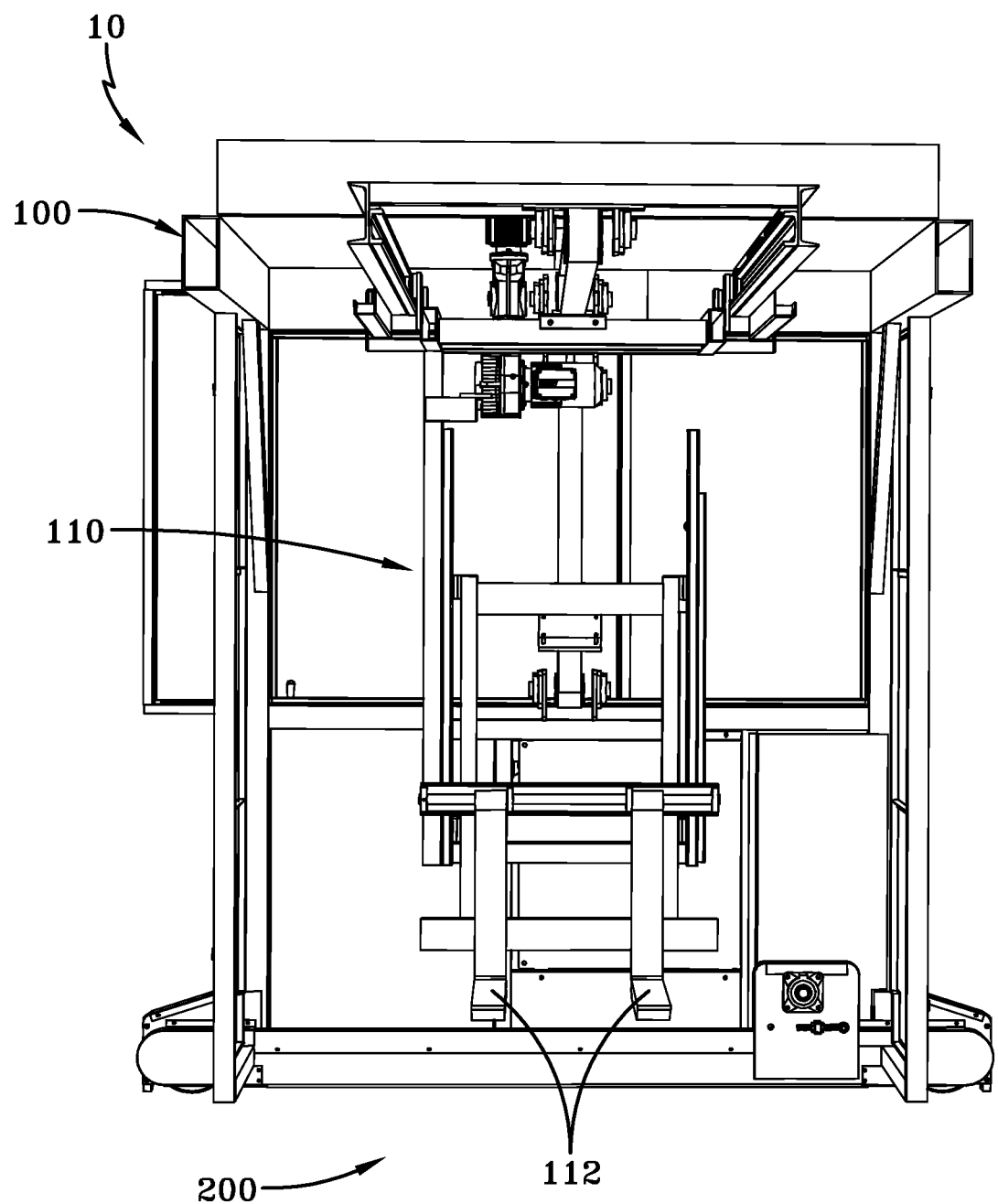
FIG. 3 is an end view of the container unloading system of FIG. 1 with various guarding in place.

One exemplary embodiment of a container unloading system 10 of the invention can be observed in FIGS. 1-3. As shown, this particular container unloading system (hereinafter "system") includes a frame 100 with a proximal and distal end 100a, 100b. The proximal end 100a of the frame 100 resides near a container unloading area (station) 200. The frame is movable laterally along (i.e., substantially parallel to) the path of container ingress/egress by a drive system, such as a drive mechanism 106 and at least one associated drive wheel 102 and guide wheel 104 that are attached to the frame. As shown, a guide track may be provided to facilitate the desired lateral movement of the frame 100 by directing movement of the guide wheels 104. Although the guide track is substantially straight in this particular embodiment, the guide track may be shaped as needed to guide the frame along a desired path. Other drive systems and components for providing lateral frame movement may also be employed.

The frame 100 as shown is comprised of a plurality of individual frame members and is substantially open and box-like in shape. A base frame supports upright legs that, in turn, support a horizontal top frame. Other frame configurations are also possible.

A lifting device 110 that includes fork arms 112 and a fork frame 114 is movably supported on the frame 100. Typically, but necessarily, the fork arms 112 resemble the size and shape of fork arms commonly found on forklifts. Also, some exemplary embodiments may use one or more rolling components located on the top face of the fork arms 112 to help containers or other objects move across the fork arms during use. Other sizes and geometries of fork arms 112 may also be used, depending upon design and other operational factors. In some exemplary embodiments, the distance between the fork arms 112 may be adjustable to engage the lifting compartments of various different sized containers.

The lifting device 110 is adapted to move both vertically with respect to the ground and in a horizontal direction that is substantially transverse to the path of container ingress/egress and the direction of lateral frame movement. A first lifting device drive mechanism comprised of a drive motor 118 and associated drive belt 120 may be used to provide vertical movement of the lifting device fork arms 112. In other exemplary embodiments, the timing belt 120 may be replaced by components including, but not limited to a driveshaft, crankshaft drives, gears, chains or other means for translating motion to move the fork arms 112 vertically upward and downward. In certain embodiments, the fork arm drive mechanism 118 has preset stops at predetermined heights that help avoid collisions with containers, carts and/or transporting vehicles.

In this particular exemplary embodiment, horizontal movement of the lifting device 110 is supported by and guided by stabilizing guide rails 116 that are attached to and extend along the top portion of the frame 100. A second lifting device drive mechanism may be used to produce horizontal movement of the lifting device 110. In this particular exemplary embodiment, the second lifting device drive mechanism is comprised of a drive motor 130 that drives a reinforced belt 120. In other exemplary embodiments, the belt 120 may be replaced by a driveshaft, crankshaft, gears, or other means for translating motion to move the lifting device 110 horizontally between the proximal to the distal ends 100a and 100b of the frame 100. In certain embodiments, the second drive mechanism 130 may also have one or more preset stops.

In embodiments where the system is wholly or partially manually operated, operator controls 140 may be attached to the frame 100 to control the movement of the system 10. In this particular embodiment, the operator controls 140 are located at the distal end 100b of the frame 100. However, the operator controls 140 may be located at any number of locations on the system 10.

For the same purpose, an operator compartment 150 may be attached to the frame 100 of the system 10. As shown, the operator compartment 150 may be attached to the distal end 100b of the frame 100. In certain embodiments, the operator compartment 150 may include a platform 152 on which an operator may stand during use of the system 10. The platform 152 would allow an operator to move along with the frame, thereby reducing operator effort. In another exemplary embodiment, the operator compartment 150 may include a seat 154 where an operator may sit during operation of the system 10. A safety cage 160 may also be attached to the frame to protect the operator.

As can be observed particularly in FIGS. 1-2, the system 10 generally abuts or is otherwise situated next to a conveyor 210 that is provided for transporting unloaded containers C to another location of the facility in which the system is installed. The conveyor 210 may be virtually any type of conveyor known in the art. The frame 100 of the system 10 is designed and arranged to move laterally and along the path of the conveyor 210, as well as along the path of container ingress/egress, which typically runs substantially parallel to the conveyor. The frame 100 of the system 10 is further designed and arranged such that trains of containers C may pass through the frame at a location that is between the lifting device 110 (when at least partially retracted) and the conveyor 210. As such, when a cart carrying a container C is pulled into the unloading station 200 by an AGV 220 or the like (as shown in FIG. 2), the lifting device may be actuated to lift the container from the cart and place it on the conveyor 210 for subsequent transport away from the unloading station. As should be understood, when a train of containers is located at the unloading station 200, the system 10 may be moved laterally along the train of containers C so as to lift each container from its cart and place it on the conveyor 210. Consequently, it is not required to move the train each time a different container is to be unloaded.

Figure 4:
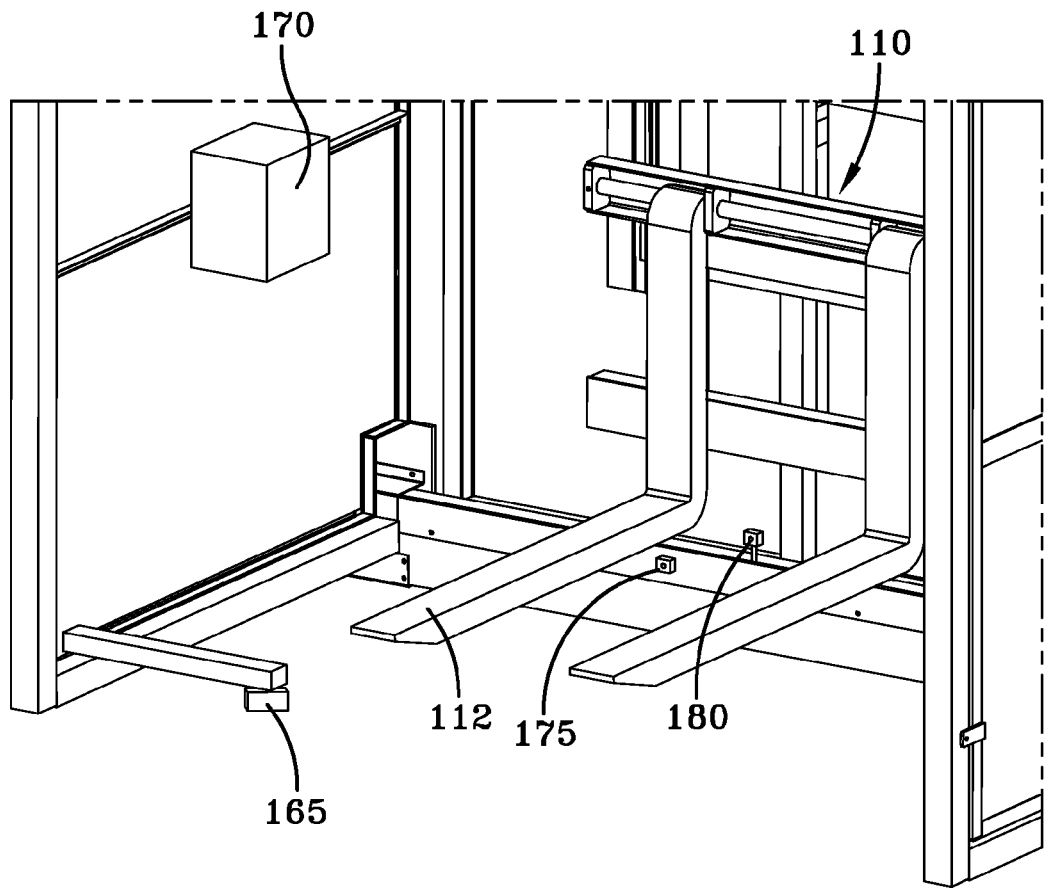
FIG. 4 is an enlarged view of a portion of FIG. 3, where various sensors can be seen for use in the control of an automatic unloading process.
Figure 8:
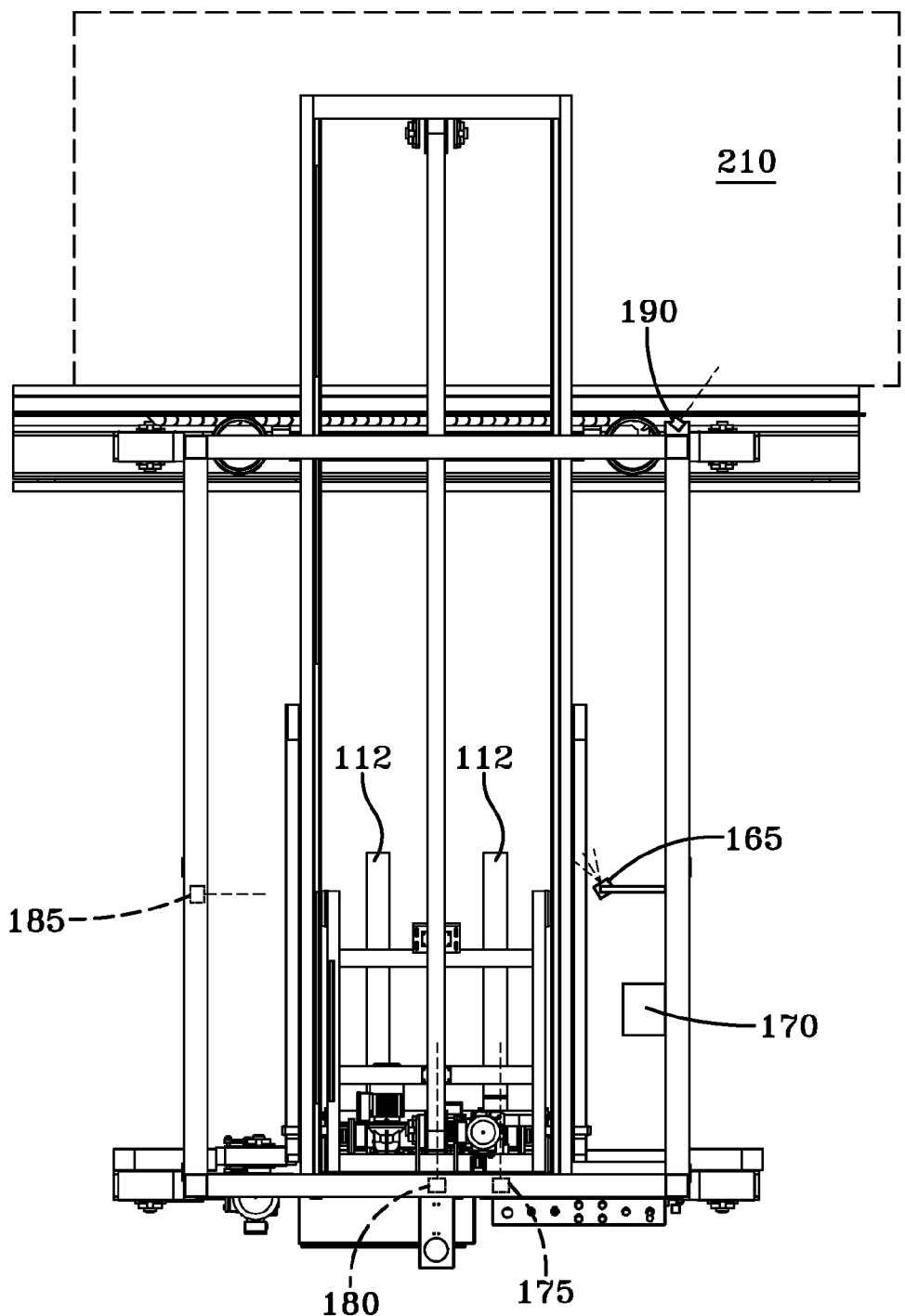
FIG. 8 is a simplified schematic overhead view of a portion of the container unloading system of FIG. 1.

Referring now to FIGS. 4 and 8, it can be observed that a plurality of sensors are provided for use in an automated unloading operation. The sensors include a bar code sensor (scanner) 165, such as but not limited to a laser bar code reader, that is positioned to read the bar code associated with each container supporting cart of a train of containers C located in the unload station 200 as the frame 100 (and system 10) moves along the train of containers during an unloading process. The bar code may contain various information about the container C located on the cart and about the cart carrying the container. For example, the barcode may instruct the system 10 which type of cart is ready to be unloaded, how to unload the cart, or to skip the cart. The barcode may also instruct the system 10 how to move to the proper position to unload the container on the cart. Thus, once the bar code scanner 165 reads a bar code, the information embedded in the bar code is transmitted to a system controller 215, such as by an Auto ID data controller 170, and the system controller instructs the lifting device 110 to move in the proper manner to unload the container, to move to another container, etc.

Referring still to FIGS. 4 and 8, it can also be observed that other sensors are also present. As shown, this embodiment also includes a cart find or cart detect sensor 175 that is activated when a cart is moved into position within the unloading station 200. In this exemplary embodiment, the cart detect sensor is a diffuse reflection sensor. The use of other types of sensors is possible in other embodiments. A signal from the cart detect sensor 175 may be used to activate the bar code scanner 165.

Another sensor 180 is provided to detect the lifting pockets located in the container residing on the cart detected by the cart detect sensor 175. A signal or signals from this lifting pocket detecting sensor 180 may be used to help guide the fork arms 112 of the lifting device 110 into proper engagement with the lifting pockets of the container.

Figure 5:
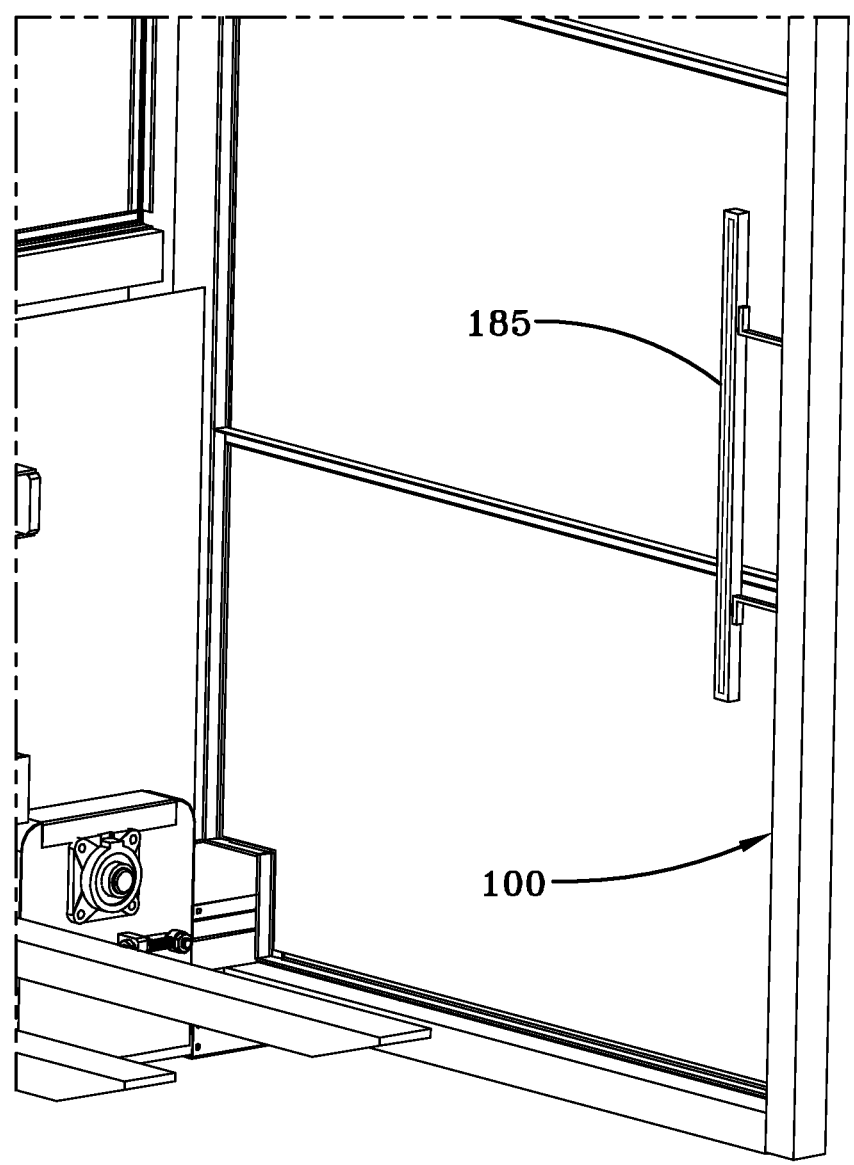
FIG. 5 is an enlarged perspective view of a portion of the guarding shown in FIG. 3, where a light array can be seen for use in the control of an automatic unloading process.

Referring now to FIGS. 5, 8 and 9, a container height sensor 185 can also be observed. The container height sensor 185 may be a plurality of individual and adjacently arranged sensors or, for example, a unitary light array. In any event, the container height sensor 185 detects the height of the container residing on the cart with which the system is currently associated. Referring specifically to FIG. 9, it can be understood that detecting the height of a container as used in this regard means that the container height sensor 185 is able to distinguish between several types of containers.

As shown in the example of FIG. 9, three separate sensors or one sensor divided into three separate sensing zones is employed. Activation of the lowest container height sensor or zone S2 in this particular example indicates that the detected container is a folded metal container. Additional activation of the next highest sensor or zone S3 in this particular example indicates that a non-extruded polystyrene foam (e.g., Styrofoam®) material is present. Additional activation of the highest sensor or zone S4 in this particular example indicates that the detected container is what is considered a tall/metal rack. As in this particular example it is undesirable to load metal racks onto the conveyor 210, a signal from zone S4 of the height sensor may be used to instruct the lifting device 110 to bypass unloading of the cart C that is carrying the metal rack. Activation of various sensors of other embodiments may indicate other types of containers. The cart detect sensor 175 is also represented in FIG. 9, as are the fork arms 112 of the lifting device 110.

Figure 6:
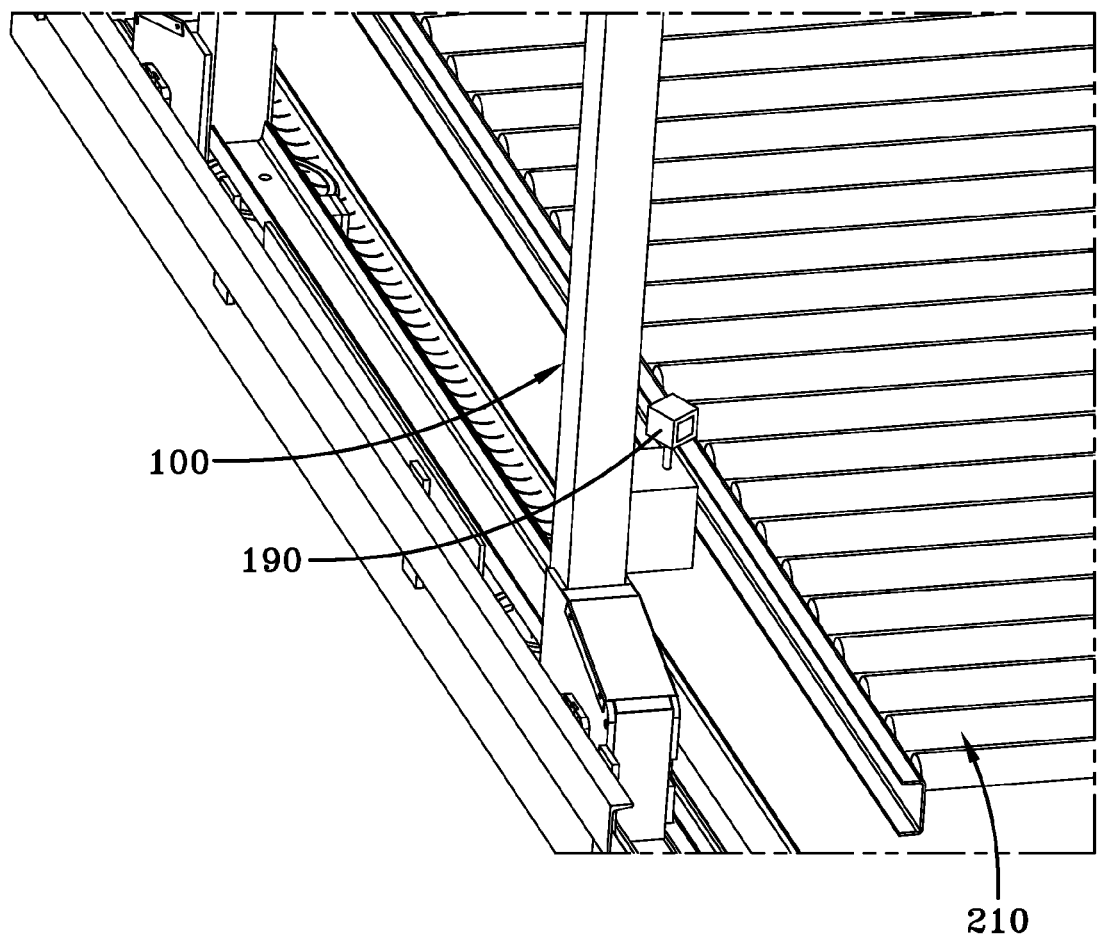
FIG. 6 is a close up view depicting a sensor of a conveyor system that is associated with the container unloading system.

A sensor for detecting the presence of an interfering container on the conveyor (a conveyor clear sensor) 190 of the system 10 is depicted in FIGS. 6 and 8. This conveyor clear sensor 190 is located along the proximal end 100a of the frame 100 or at some other location where the sensor may be used to determine whether a container is already present on the conveyor 210 at a location where the current container to be unloaded by the system is to be set. If no interfering container is detected by the conveyor clear sensor 190, then the designated container may be lifted from the cart by the lifting device 110 and set on the conveyor 210, as shown in FIG. 2. If a container is detected on the conveyor 210 at a location that will interfere with unloading of the next container by the system 10, then various actions may be taken. In one example, the system 10 may move to another container in the train of containers in such a case, thereby postponing unloading of the previously designated container until the requisite spot on the conveyor 210 is clear. Alternatively, if downstream space is available, the system 10 may be adapted to communicate with the conveyor 210 in order to advance the interfering container to a non-interfering location. Still alternatively, the system 10 may alert an operator that a container is present on the conveyor 210 and wait for the operator to cause the container to be moved to a non-interfering location or otherwise instruct the system how to proceed. Other courses of action are also possible.

Figure 7:
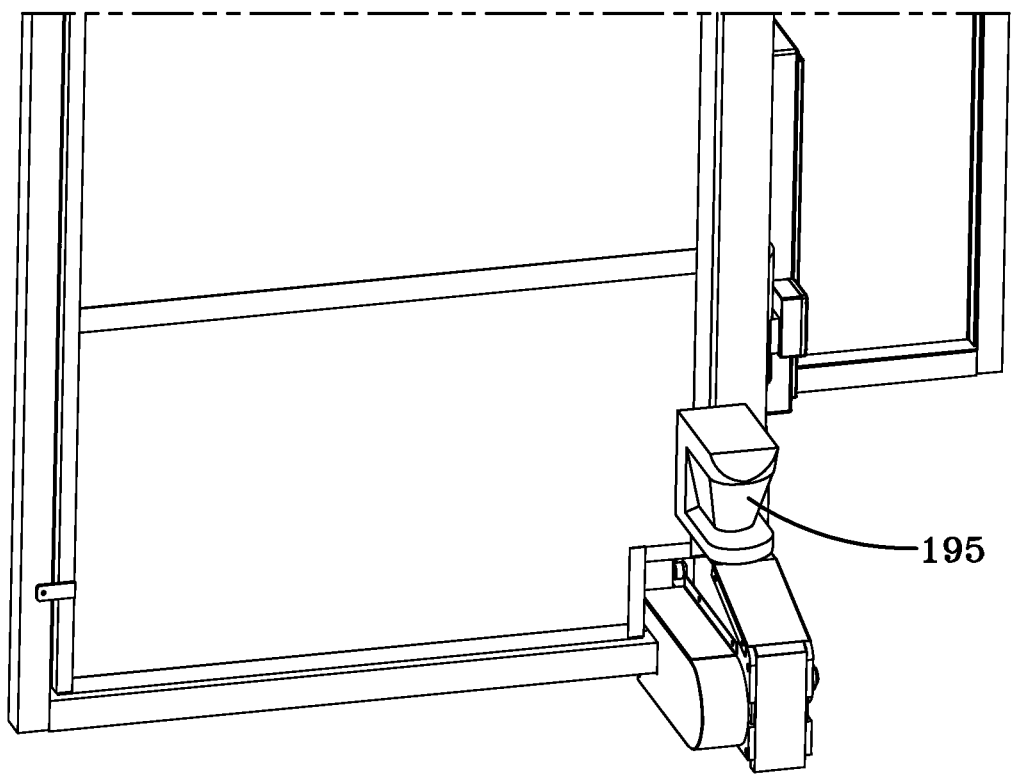
FIG. 7 shows a safety laser scanner that forms a part of a container unloading system of the invention.

A safety laser scanner 195 is depicted in FIG. 7. The safety laser scanner 195, or a similar sensor, may be provided to scan/view the surrounding area that exists laterally of the frame 100. The laser safety scanner 195 may be adapted to send a signal to the system controller when the safety laser scanner detects an object within its field of view. Consequently, lateral movement of the frame 100 may be halted or prevented if the laser safety scanner 195 detects an object in the intended path of frame movement.

In operation, a transport vehicle such as the AGV 220 shown, transports a container-carrying cart or a train of container-carrying carts to the unload station 200. When the transport vehicle is of a type operated by a human driver, a light 225 and/or some other indicator may be provided to indicate when it is safe to pull the associated carts into the unload station 200. The light 225 or other indicator may also be used to generally indicate when it is safe to enter cart unloading area of the unload station 200.

Once the carts have stopped and the cart detect sensor 175 indicates that a cart is present, the system 10 is activated for the purpose of unloading the containers. Activation of the system may occur by detecting a cart, and/or by detecting the position and lack of motion of the transporting vehicle, and/or or by requiring the actuation of a cycle start button by an operator, etc. In any case, it should be verified that the transporting vehicle is properly positioned outside the working envelope of the system 10—particularly when the transporting vehicle includes a human operator. Safety light curtains and/or other sensors and lock out/tag out procedures may be employed, as would be understood by one of skill in the art, to prohibit entry into the working envelope of the system 10 while the system is in operation. A safe entry signal 225 may also be provided to alert an operator when it's safe to enter the working envelope, as described above.

Once the system 10 is activated, the frame 100 will typically move to the first cart in the train and use the bar code scanner 165 to read the barcode associated with that cart. Based on the instructions embedded in the bar code, the system may unload the container residing on the first cart or move to another cart/container. A signal(s) from the pocket detecting sensor 180 may be used to guide the fork arms 112 of the lifting device 110 into proper engagement with the lifting pockets of the container. A signal from the conveyor clear sensor 190 may be used in conjunction with the embedded barcode information to determine the order of container unloading. Container height information provided by the container height sensor 190 may also be used to assist with the container unloading process in for example, a manner described above. This cycle is repeated until all of the containers of the train that should be unloaded have been unloaded onto the conveyor 210. Once all of the appropriate containers have been unloaded, the carts are removed from the unloading station 200 by the AGV 220 and a new train of carts/containers enters.

As should be apparent, a microprocessor-based controller 215 and an associated program are used to control operation of the system 10. The controller 215 receives signals from the various sensors and uses the information contained in those signals to govern system operation. The controller 215 may be located at various places on the system such as, but not limited to, with the operator controls 140 at the distal end 100b of the frame 100.

The system 10 may also include a pause button or similar operator activatable actuator that allows for a temporary halting of system operation (e.g., frame and/or lifting device movement). For example, if an operator notices a damaged container while observing a container unloading operation, the operator can use the pause button to temporary halt system operation.

Having shown and described various exemplary embodiments of the invention, those skilled in the art will realize that variations and modifications may be made to the described embodiments while still being within the scope of the claims. Thus, many of the elements indicated above may be altered or replaced by different elements which will provide the same result and fall within the spirit of the claimed embodiments. It is the intention, therefore, to limit the invention only as indicated by the scope of the claims.

What is claimed is:

1. A system for unloading a container from a cart while the cart resides in an unloading station, comprising:
   a frame, the frame movable along a path of ingress/egress by which the cart is moved through the unloading station;
   a lifting device supported on the frame, the lifting device adapted to move along the frame and to lift the container from the cart;
   a bar code sensor adapted to read a bar code associated with the cart;
   a cart detect sensor for detecting the presence of the cart in the unloading station;
   a lifting pocket detecting sensor adapted to detect lifting compartments located in the container; and
   a controller and associated program, the controller adapted to receive signals from the sensors and to use the signals to move the frame as needed and to operate the lifting device to remove the container from the cart.

2. The system of claim 1, further comprising a container height sensor, the container height sensor adapted to detect the height of the container on the cart and to send a corresponding signal to the controller.

3. The system of claim 1, wherein the unloading station includes a conveyor and the lifting device is adapted to lift the container from the cart and place it onto the conveyor.

4. The system of claim 3, further comprising a conveyor clear sensor in communication with the controller and adapted to detect an interfering container on the conveyor.

5. The system of claim 1, wherein a signal from the cart detect sensor is used to activate the bar code scanner.

6. The system of claim 1, wherein the lifting device is comprised of lifting forks suspended from a lifting frame.

7. The system of claim 6, wherein the lifting device is adapted for both vertical and horizontal movement.

8. The system of claim 7, wherein the horizontal movement of the lifting device is along a path that is substantially transverse to the direction of movement of the frame and to the path of ingress/egress of the cart.

9. The system of claim 1, wherein the controller is programmed to automatically start an unloading operation after the cart detect sensor detects the presence of the cart.

10. The system of claim 1, further comprising a cycle start actuator that must be activated by an operator before an unloading operation can begin.

11. The system of claim 1, further comprising a cycle pause actuator by which movement of the lifting device and/or the frame may be halted.

12. A system for automatically unloading a plurality of containers from corresponding carts while the carts and containers reside in an unloading station, comprising:
   a conveyor located along the unloading station;
   a frame, the frame movable along a path of ingress/egress by which the carts are moved through the unloading station;
   a vertically and horizontally movable lifting device supported on the frame, the lifting device including fork arms and adapted to move along the frame and to lift the containers from the carts and onto the conveyor;
   a bar code sensor adapted to read a bar code associated with each cart prior to unloading of the container therefrom, each bar code containing information usable to help direct unloading of the associated container;
   a cart detect sensor for detecting the presence of a cart in the unloading station, a signal from the cart detect sensor usable to initiate operation of the bar code scanner;
   a lifting pocket detecting sensor adapted to detect lifting compartments located in the containers, a signal from the lifting pocket sensor usable to help guide the fork arms of the lifting device into engagement with corresponding containers;
   a container height sensor, the container height sensor adapted to detect the height of the containers; and
   a controller and associated program, the controller adapted to receive signals from the sensors and to use the signals to move the frame from container-to-container and to operate the lifting device to remove the containers from the carts to the conveyor.

13. The system of claim 12, further comprising a conveyor clear sensor in communication with the controller and adapted to detect an interfering container on the conveyor.

14. The system of claim 13, wherein the controller is programmed to cause the frame and lifting device to move to the next container to be unloaded when the conveyor clear sensor detects an interfering container on the conveyor.

15. The system of claim 12, wherein the horizontal movement of the lifting device is along a path that is substantially transverse to the direction of movement of the frame and to the path of ingress/egress of the cart.

16. The system of claim 12, wherein the container height sensor is selected from the group consisting of a plurality of individual sensors and a unitary light array.

17. The system of claim 16, wherein the container height sensor is adapted to determine the type of container residing on a given cart by detecting its height.

18. The system of claim 12, further comprising a cycle pause actuator by which movement of the lifting device and/or the frame may be halted.

* * * * *